United States Patent
Kawase et al.

(10) Patent No.: US 9,701,028 B2
(45) Date of Patent: Jul. 11, 2017

(54) ROBOT

(71) Applicant: Seiko Epson Corporation, Tokyo (JP)

(72) Inventors: Tetsuya Kawase, Azumino (JP); Shingo Hoshino, Hokuto (JP)

(73) Assignee: Seiko Epson Corporation (JP)

( * ) Notice: Subject to any disclaimer, the term of this patent is extended or adjusted under 35 U.S.C. 154(b) by 369 days.

(21) Appl. No.: 14/515,808

(22) Filed: Oct. 16, 2014

(65) Prior Publication Data

US 2015/0114161 A1    Apr. 30, 2015

(30) Foreign Application Priority Data

Oct. 28, 2013 (JP) .................................. 2013-223014

(51) Int. Cl.
B25J 19/00 (2006.01)
B25J 9/00 (2006.01)

(52) U.S. Cl.
CPC ......... *B25J 19/0025* (2013.01); *B25J 9/0009* (2013.01); *B25J 19/005* (2013.01); *Y10T 74/20305* (2015.01)

(58) Field of Classification Search
CPC ..... B25J 19/0025; B25J 9/0009; B25J 19/005
See application file for complete search history.

(56) References Cited

U.S. PATENT DOCUMENTS

| RE33,523 E | * | 1/1991 | Devine | F16K 27/08 137/341 |
|---|---|---|---|---|
| D338,734 S | * | 8/1993 | McCoy | F16K 27/08 D26/37 |
| 8,607,658 B2 | | 12/2013 | Ono et al. | |
| 2005/0123825 A1 | * | 6/2005 | Nakamura | H01M 2/204 429/99 |
| 2006/0121337 A1 | * | 6/2006 | Cheng | E06B 9/32 429/97 |
| 2010/0136400 A1 | * | 6/2010 | Yang | E05C 19/06 429/100 |
| 2012/0279341 A1 | | 11/2012 | Ono et al. | |
| 2015/0207130 A1 | * | 7/2015 | Maguire | H01M 2/1083 429/97 |

FOREIGN PATENT DOCUMENTS

JP    2005-041575 A    2/2005
JP    2012-254525 A    12/2012

* cited by examiner

*Primary Examiner* — David M Fenstermacher
(74) *Attorney, Agent, or Firm* — Harness, Dickey & Pierce, P.L.C.

(57) ABSTRACT

A robot according to an aspect of the invention includes an enclosure having an opening formed therein, a lid section that is provided on the enclosure in a detachable manner and blocks at least part of the opening, an attachment and detachment section which is provided on the lid section on the side facing the opening of the enclosure and to and from which a replaceable part is attached and detached, and a holding mechanism that allows the enclosure to hold the lid section when the lid section is detached from the enclosure.

4 Claims, 7 Drawing Sheets

ROBOT

BACKGROUND

1. Technical Field

The present invention relates to a robot.

2. Related Art

For example, in the robot described in JP-A-2012-254525, a battery and other parts required to be replaced are provided in a base and an arm in many cases.

To replace a battery and other parts provided in a robot of the type described above, an entire enclosure that covers a portion where a replaceable part is provided needs to be detached or otherwise manipulated, resulting in consumption of time and labor. Further, an enclosure of a robot cannot be detached in some cases, for example, unless tubing, wiring, and other production facilities provided around the robot are removed, undesirably resulting in a greater amount of consumption of time and labor.

SUMMARY

An advantage of some aspects of the invention is to provide a robot that allows a replaceable part provided therein to be readily replaced.

A robot according to an aspect of the invention includes an enclosure having an opening formed therein, a lid section that is provided on the enclosure in a detachable manner and blocks at least part of the opening, an attachment and detachment section which is provided on the lid section on the side facing the opening of the enclosure and to and from which a replaceable part is attached and detached, and a holding mechanism that allows the enclosure to hold the lid section when the lid section is detached from the enclosure.

In the robot according to the aspect of the invention, the attachment and detachment section to and from which a replaceable part is attached and detached is provided on the lid section attached to the enclosure in a detachable manner. The replaceable part can therefore be replaced by detaching only the lid section from the enclosure without detachment of the entire enclosure. The robot provided in accordance with the aspect of the invention therefore allows a replaceable part provided therein to be readily replaced.

The replaceable part may be a battery.

According to the configuration described above, the amount of time and labor required to replace the battery, which is frequently replaced, can be reduced.

A movable member and a base that supports the movable member may be further provided, the base may include the enclosure, and the lid section may be provided on the enclosure of the base.

According to the configuration described above, since the lid section is provided on the base, which is relatively unlikely to be surrounded by production facilities, the replaceable part is more readily replaced.

The holding mechanism may include a cutout formed in the lid section and an engaging portion that constitutes the opening and engages with the cutout.

According to the configuration described above, the lid section can be held by simple operation of allowing the cutout and the engaging portion to engage with each other.

The holding mechanism may further include a sandwiching portion that sandwiches the lid section in a position shifted from the engaging portion toward the lid section when the cutout and the engaging portion engage with each other.

According to the configuration described above, since the sandwiching portion can sandwich the lid section, the lid section can be held in a more stable manner.

A robot according to another aspect of the invention includes a movable member, a base that supports the movable member, a lid section that is provided on an enclosure of the base in a detachable manner and blocks at least part of an opening formed in the enclosure, an attachment and detachment section which is provided on the lid section on the side facing the opening of the enclosure and to and from which a replaceable part is attached and detached, and a holding mechanism that allows the enclosure of the base to hold the lid section when the lid section is detached from the enclosure of the base. The holding mechanism includes a cutout formed in the lid section, an engaging portion that constitutes the opening and engages with the cutout, and a sandwiching portion that sandwiches the lid section in a position shifted from the engaging portion toward the lid section when the cutout and the engaging portion engage with each other. The lid section is a rectangular flat plate in a plan view. The cutout is inclined to one side of the outer shape of the lid section.

In the robot according to the another aspect of the invention, since the cutout is inclined to one side of the outer shape of the lid section, the cutout and the engaging portion are readily allowed to engage with each other, and the lid section can be readily held by the enclosure.

BRIEF DESCRIPTION OF THE DRAWINGS

The invention will be described with reference to the accompanying drawings, wherein like numbers reference like elements.

DESCRIPTION OF EXEMPLARY EMBODIMENTS

A robot according to an embodiment of the invention will be described below with reference to the drawings.

In the present embodiment, the description of the robot will be made with reference to a SCARA (selective compliance assembly robot arm) robot (horizontally articulated robot) by way of example. Further, in the present embodiment, the description will be made of a case where a replaceable part is a battery by way of example.

The scope of the invention is not limited to the following embodiment and can be arbitrarily changed within the technical spirit of the invention. Further, in the following drawings, the scale, the number, and other attributes of each structure differ from those of an actual structure in some cases for ease of illustration of each configuration.

Figure 1:
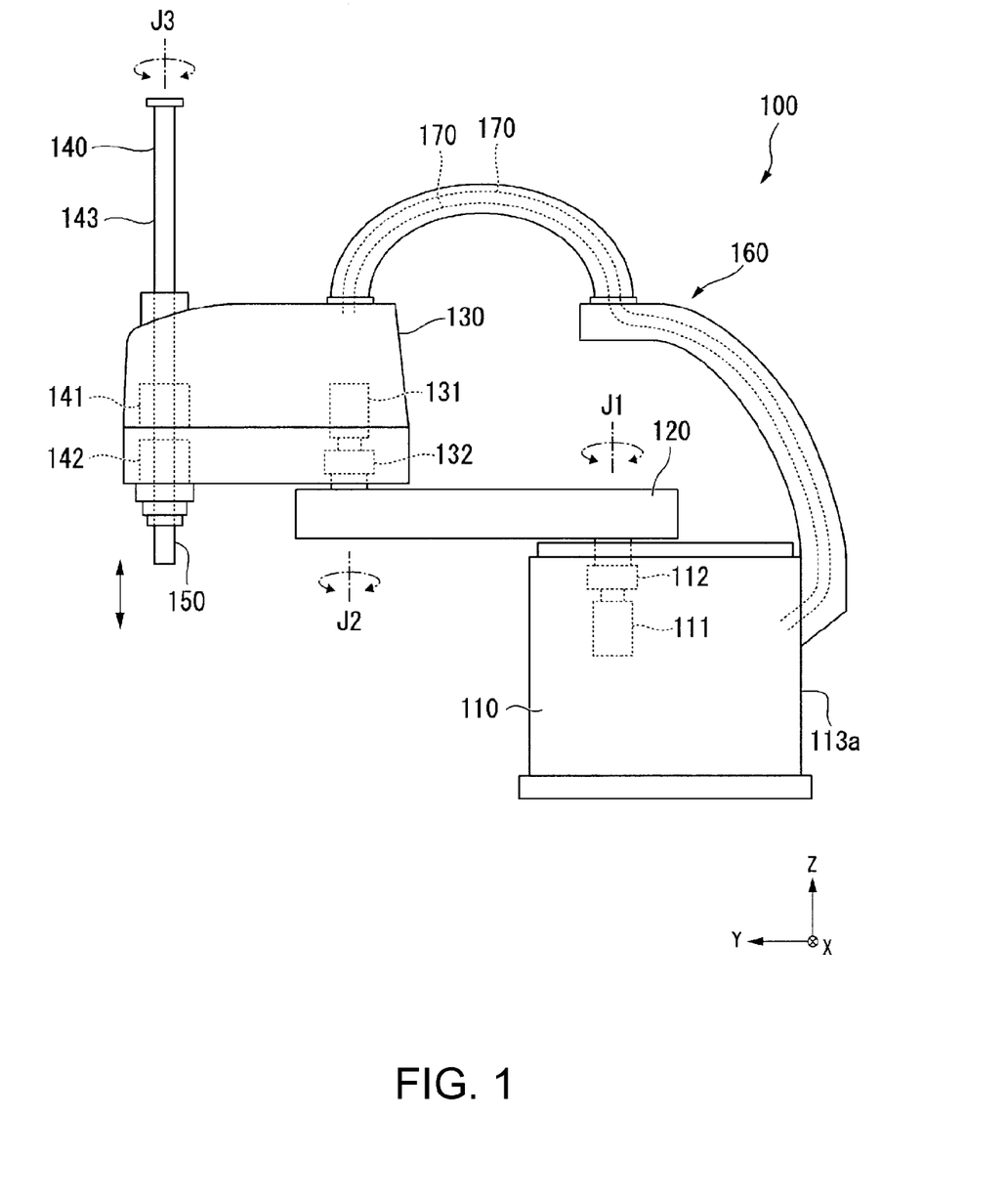
FIG. 1 is a side view showing a SCARA robot according to an embodiment of the invention.
Figure 2:
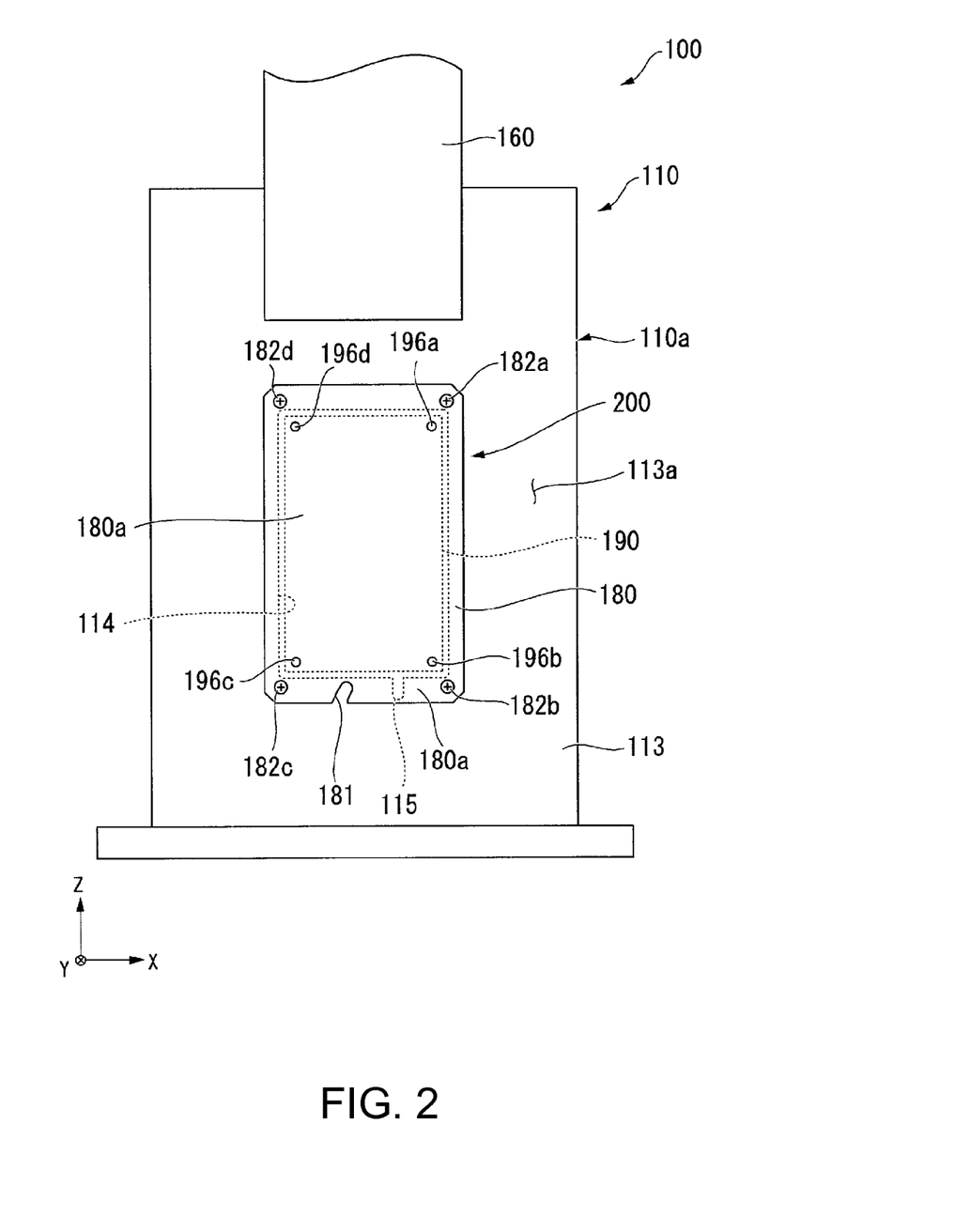
FIG. 2 is a rear view showing a base in the present embodiment.

FIG. 1 is a side view showing a SCARA robot 100 according to the present embodiment. FIG. 2 is a rear view showing a base 110 of the SCARA robot 100 according to the present embodiment.

An XYZ coordinate system is set in the following description, and the positional relationship among members will be described with reference to the XYZ coordinate system. The XYZ coordinate system is defined as follows: The Z-axis direction is the vertical direction; the Y-axis direction is not only the horizontal direction but also the longitudinal direction (rightward/leftward direction in FIG. 1) of the base 110 (see FIG. 1); and the X-axis direction (rightward/leftward direction in FIG. 2) is the width direction of the base 110.

The SCARA robot 100 according to the present embodiment includes the base 110, a first arm (movable member) 120, a second arm (movable member) 130, a work head 140, an end effector 150, a wiring router 160, and a replacement unit 200, as shown in FIGS. 1 and 2. The replacement unit 200 includes a lid section 180 and a replacement section 190, as shown in FIG. 2.

Figure 3:
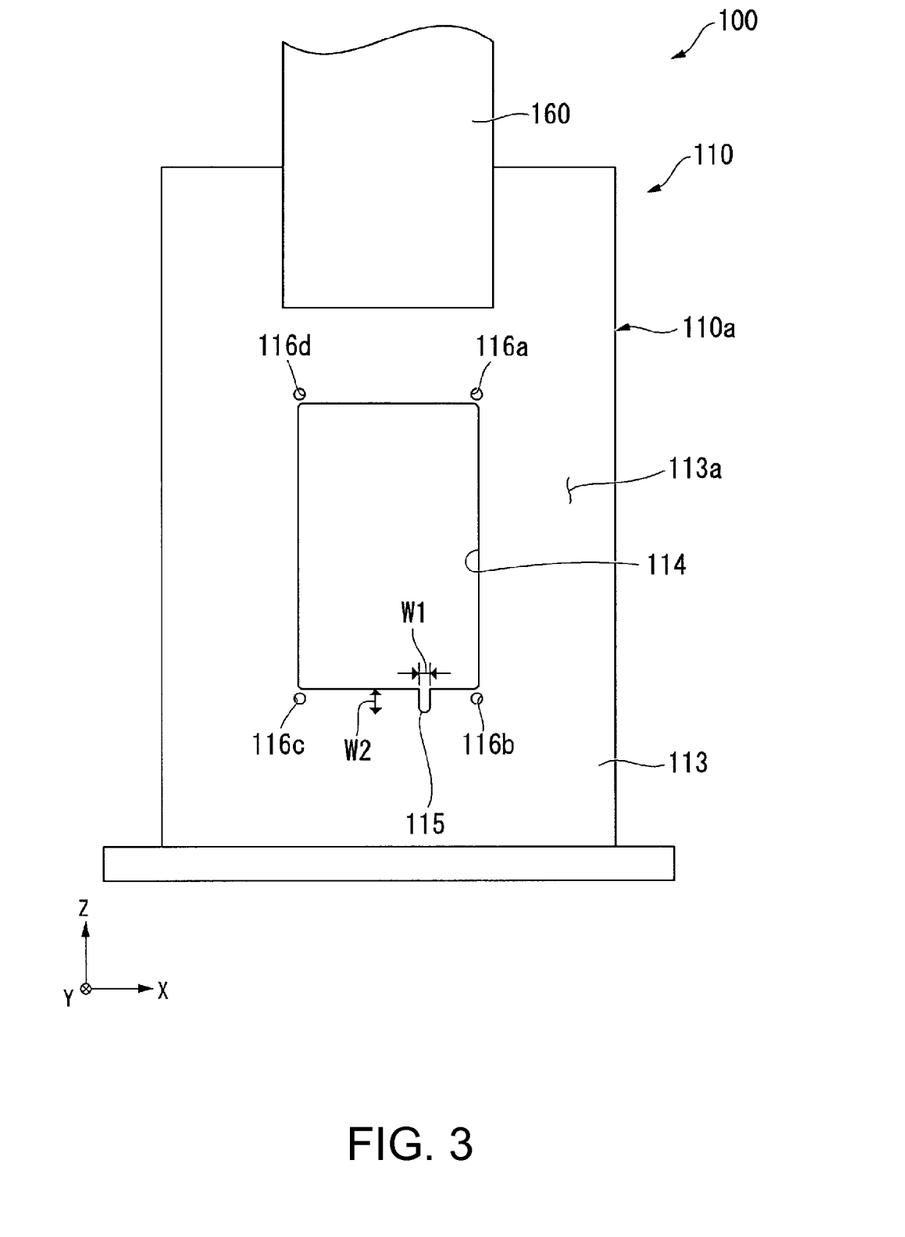
FIG. 3 is a rear view showing the base in the present embodiment and shows a state in which a replacement unit is detached.

FIG. 3 is a rear view showing the base 110 with the replacement unit 200 detached.

The base 110 is fixed, for example, to a floor surface (not shown) with bolts or any other fasteners. The base 110 includes an enclosure 110a, as shown in FIG. 3. The enclosure 110a of the base 110 has an opening 114, a base-side cutout 115, fixing holes 116a, 116b, 116c, and 116d, which are all formed in a rear surface 113a of the enclosure 110a.

The thus provided opening 114 allows the replacement section 190 in the replacement unit 200 to be accommodated into the base 110 (enclosure 110a). The opening 114 is so formed that it passes through a rear wall 113 having the rear surface 113a in the thickness direction (Y-axis direction) (see FIG. 8). The opening 114 has a substantially rectangular shape in a plan view (in ZX-plane view). The opening 114 is so formed that the base-side cutout 115 is part of the opening 114.

The base-side cutout 115 is a band-shaped cutout extending downward (toward −Z side) in the vertical direction. The vertically lower (−Z side) end of the base-side cutout 115 has an arcuate shape. The base-side cutout 115 is formed in a position shifted from the center of the opening 114 in the width direction thereof (X-axis direction) toward one side (+X side).

The width W1 (length in X-axis direction) of the base-side cutout 115 is set at a value greater than or equal to the thickness of the lid section 180 in the replacement unit 200, for example, set to be as thick as the lid section 180. The thus dimensioned base-side cutout 115 allows improvement in stability of the replacement unit 200, which will be described later, when the replacement unit 200 is held by the base 110 (enclosure 110a). The width W1 is, for example, about 3.7 mm. The length W2 (length in Z-axis direction) of the base-side cutout 115 is, for example, about 7 mm.

The opening 114 and the base-side cutout 115 are blocked with the lid section 180 when the replacement unit 200 is attached to the base 110, as shown in FIG. 2.

The fixing holes 116a, 116b, 116c, and 116d shown in FIG. 3 are holes into which bolts 182a to 182d for fixing the replacement unit 200, which will be described later, to the base 110 are screwed. A female thread is formed in the inner surface of each of the fixing holes 116a to 116d.

Figure 4:
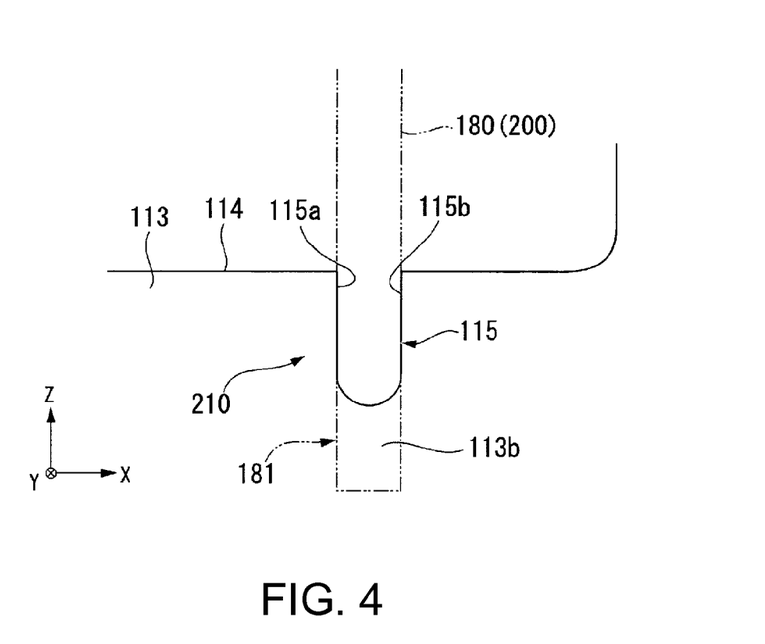
FIG. 4 shows the base in the present embodiment and is a partial enlarged view of a portion in FIG. 3.

FIG. 4 shows the base 110 and is a partial enlarged view of a portion in FIG. 3. In FIG. 4, the chain double-dashed line represents the replacement unit 200 held by the base 110.

The rear wall 113 has an engaging portion 113b, with which a lid-side cutout (cutout) 181 formed in the lid section 180 in the replacement unit 200, which will be described later, engages, as shown in FIG. 4. The engaging portion 113b is a portion that constitutes the opening 114, more specifically, the base-side cutout 115.

The formation of the base-side cutout 115 results in formation of sandwiching portions 115a and 115b in the rear wall 113. The sandwiching portions 115a and 115b are surfaces that are formed in the rear wall 113 by the base-side cutout 115 and are perpendicular to the rear surface 113a and parallel to the vertical direction (Z-axis direction) (surfaces parallel to YZ plane). In the state in which the replacement unit 200 is held, the sandwiching portions 115a and 115b sandwich the lid section 180 on the side shifted from the engaging portion 113b toward the lid section 180 (+Z side).

The SCARA robot 100 according to the present embodiment includes a holding mechanism 210, which is formed of the lid-side cutout 181, the engaging portion 113b, and the sandwiching portions 115a and 115b described above. In the present embodiment, causing the lid-side cutout 181 in the holding mechanism 210 to engage with the engaging portion 113b allows the base 110 (enclosure 110a) to hold the replacement unit 200, as will be described later in detail.

In the present embodiment, the term "engaging portion" is not limited to a portion that constitutes part of the base-side cutout 115 as shown in FIG. 4 and may be any portion with which the lid-side cutout 181 can engage. Further, the term "sandwiching portion" is not limited to a portion formed of a cutout, such as the base-side cutout 115, and may be any portion capable of sandwiching the lid section 180.

Referring back to FIG. 1, the first arm 120, which is allowed to pivot relative to the base 110 around a first axis J1 extending along the vertical direction (Z-axis direction), is connected to an upper end portion of the base 110.

In the base 110 are disposed a first motor 111, which causes the first arm 120 to pivot, and a first speed reducer 112. The input shaft of the first speed reducer 112 is connected to the rotating shaft of the first motor 111, and the output shaft of the first speed reducer 112 is connected to the first arm 120.

The second arm 130, which is allowed to pivot relative to the first arm 120 around a second axis J2 extending along the vertical direction (Z-axis direction), is connected to a front end portion of the first arm 120.

In the second arm 130 are disposed a second motor 131, which causes the second arm 130 to pivot, and a second speed reducer 132. The input shaft of the second speed reducer 132 is connected to the rotating shaft of the second motor 131, and the output shaft of the second speed reducer 132 is connected and fixed to the first arm 120.

The work head 140 is disposed at a front end portion of the second arm 130. The work head 140 has a spline nut 141 and a ball screw nut 142, which are coaxially disposed in the front end portion of the second arm 130, and a spline shaft 143, which is inserted into the spline nut 141 and the ball screw nut 142. The spline shaft 143 is rotatable relative to the second arm 130 around an axis J3 extending along the vertical direction (Z-axis direction) and movable (capable of ascent and decent) in the upward/downward direction.

The end effector 150 is connected to a front end portion (lower end portion) of the spline shaft 143. The end effector 150 is not limited to a specific component and may, for example, be a component that grasps an object to be transported or a component that processes an object to be processed.

A plurality of wiring lines 170, which are connected to the electronic parts (second motor 131, for example) disposed in the second arm 130, are routed into the base 110 via the wiring router 160, which has a tubular shape and connects the second arm 130 to the base 110. Further, the plurality of wiring lines 170, which are bundled together in the base 110, are routed along with wiring lines connected to the first motor 111 to a controller (not shown) that is disposed external to the base 110 and oversees and controls the SCARA robot 100.

The replacement unit 200 is attached to the rear surface 113a of the base 110 (enclosure 110a) in a detachable manner, as shown in FIG. 2.

In the present embodiment, the phrase "in a detachable manner" not only means that the replacement unit 200 can be completely separated from the base 110 (enclosure 110a) but also means that in the state in which the replacement unit 200 is attached to the base 110, the attitude of the replacement unit 200 can be so changed that the side thereof facing the opening 114 of the base 110 (+Y side) is exposed to the outside. The same holds true for any other member that is attached to a certain component "in a detachable manner."

The lid section 180 is a rectangular flat plate with the four corners thereof chamfered. In the state in which the replacement unit 200 is attached to the base 110, the lid section 180, specifically, the four corners thereof are fixed to the rear surface 113a of the enclosure 110a with the bolts 182a, 182b, 182c, and 182d. The bolts 182a to 182d are inserted through the lid section 180 from the side where a surface 180a thereof is present and screwed into the fixing holes 116a to 116d (see FIG. 3).

The lid-side cutout (cutout) 181 is formed in a vertically lower (−Z side) end portion of the lid section 180, as shown in FIG. 2. The lid-side cutout 181 is formed in a position shifted from the center of the lid section 180 in the width direction thereof (X-axis direction) toward one side (−X side).

Figure 5:
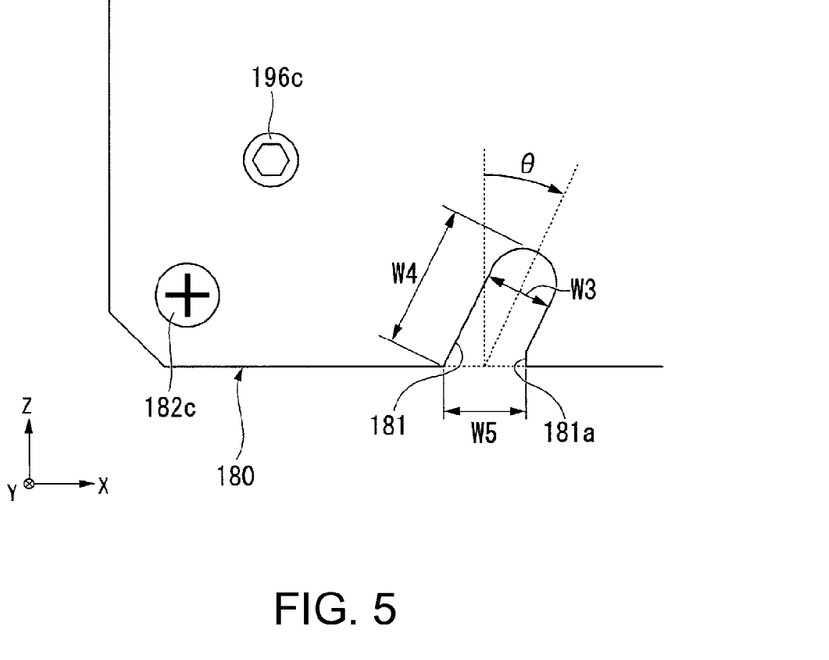
FIG. 5 is a partial enlarged view of a lid section in the present embodiment.

FIG. 5 is a partial enlarged view of the lid section 180 shown in FIG. 2.

The lid-side cutout 181 is a band-shaped cutout having an arcuate end located in the lid section 180, as shown in FIG. 5. The lid-side cutout 181 is inclined by an angle θ to the longer sides of the outer shape of the lid section 180, that is, the sides parallel to the vertical direction (Z-axis direction) and oriented toward the center of the lid section 180 in the width direction thereof (+X side).

A chamfered portion 181a is formed at one of the vertically lower (−Z side) ends of the lid-side cutout 181, specifically, the end facing the center of the lid section 180 in the width direction thereof (+X side). The chamfered surface of the chamfered portion 181a is parallel to the longer sides of the outer shape of the lid section 180.

The width W3 of the lid-side cutout 181 is set at a value greater than or equal to the thickness of the rear wall 113 of the base 110, for example, set to be as thick as the rear wall 113. The thus dimensioned lid-side cutout 181 allows improvement in stability of the replacement unit 200 when it is held by the base 110. The width W3 is, for example, about 3.7 mm. The length W4 of the lid-side cutout 181 is, for example, about 7 mm. The width W5 of the opening of the lid-side cutout 181 is made wider by the chamfered portion 181a than the width W3 of the lid-side cutout 181. The width W5 of the opening of the lid-side cutout 181 is, for example, about 4 mm.

In the present embodiment, the term "lid section" means a member that is attached to an enclosure of the SCARA robot 100, for example, the enclosure 110a of the base 110 in a detachable manner and blocks at least part of the opening formed in the enclosure in the state in which the "lid section" is attached to the enclosure.

Figure 6:
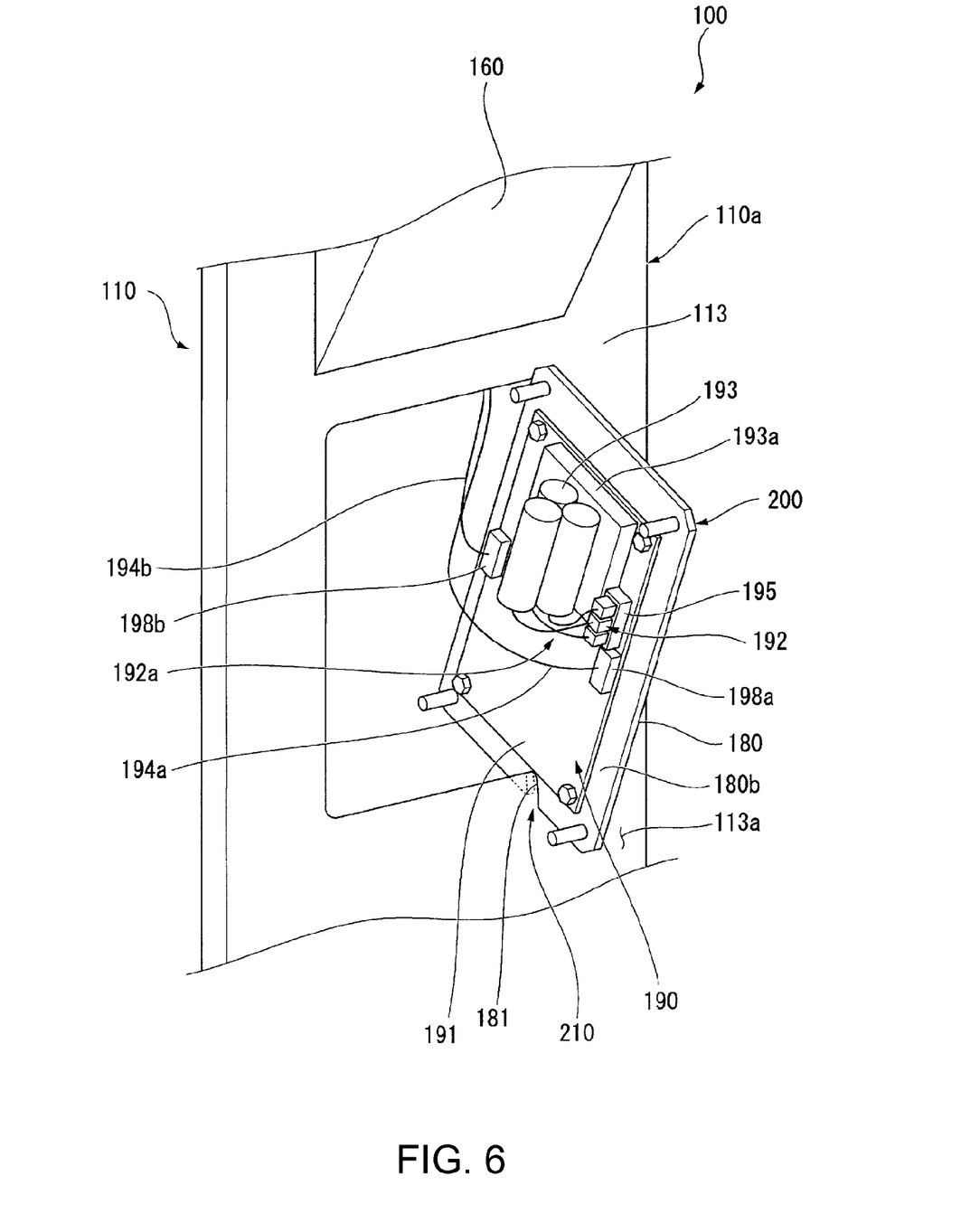
FIG. 6 is a perspective view showing a state in which the lid section is held in the present embodiment.
Figure 7:
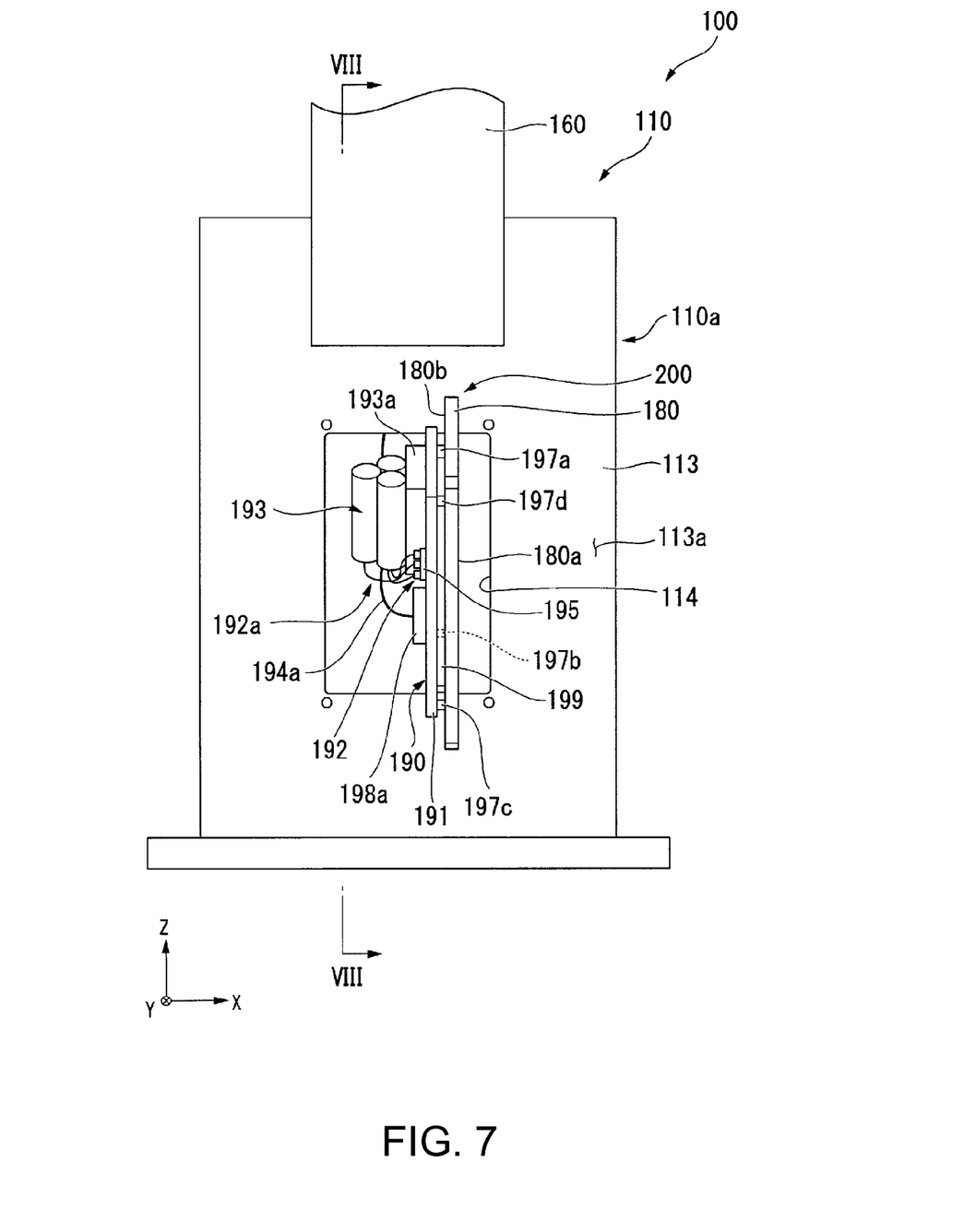
FIG. 7 is a rear view showing the state in which the lid section is held in the present embodiment.
Figure 8:
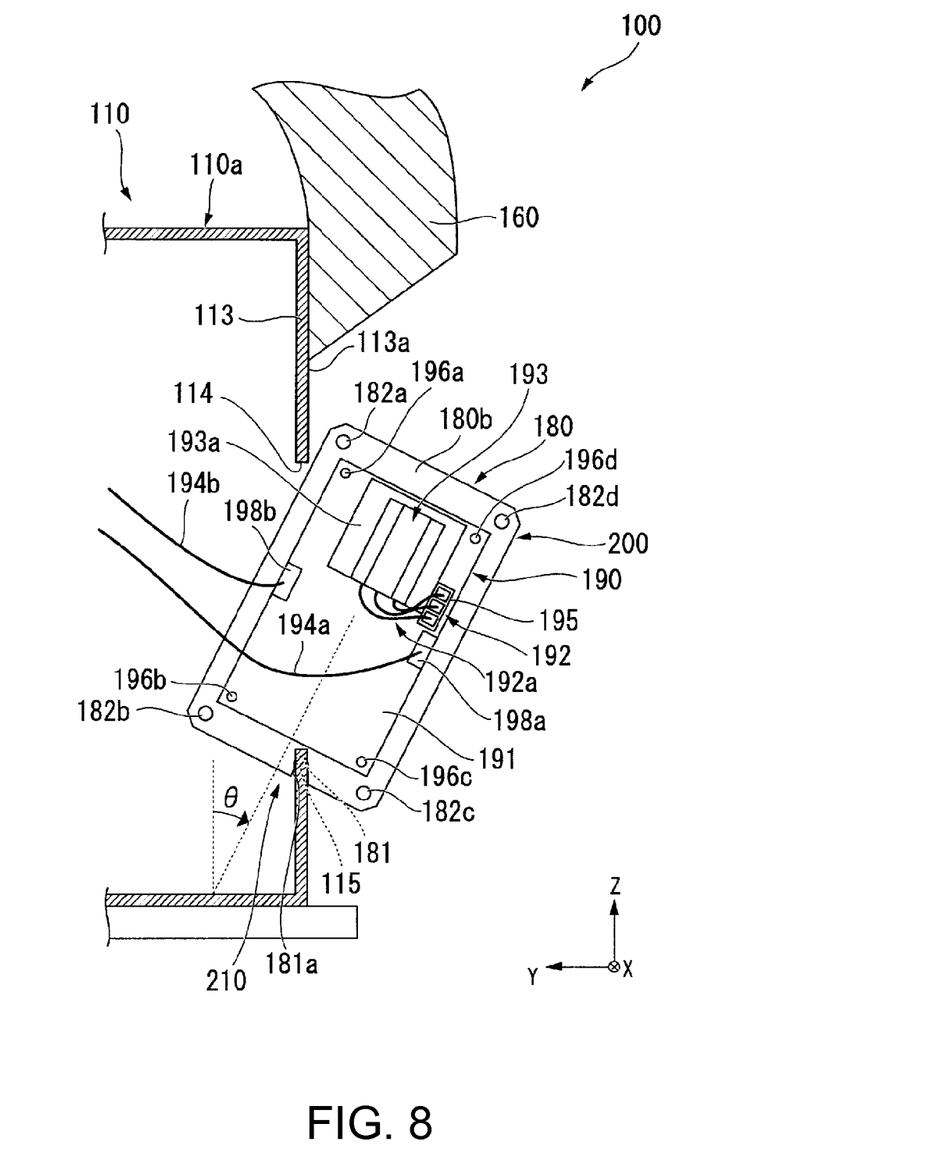
FIG. 8 shows the state in which the lid section is held in the present embodiment and is a cross-sectional view taken along the line VIII-VIII in FIG. 7.

FIGS. 6 to 8 show a state in which the replacement unit 200 is detached and held by the base 110. FIG. 6 is a perspective view. FIG. 7 is a rear view. FIG. 8 is a cross-sectional view taken along the line VIII-VIII in FIG. 7.

The replacement section 190 is provided on a rear surface 180b of the lid section 180, as shown in FIGS. 6 to 8. The rear surface 180b is a surface that faces the interior (+Y side) of the base 110, that is, the opening 114 when the replacement unit 200 is attached to the base 110. The replacement section 190, specifically, the four corners thereof are fixed to the lid section 180 with bolts 196a, 196b, 196c, and 196d in the present embodiment.

The replacement section 190 includes a motor control substrate 191, a battery connecter receiver (attachment and detachment section) 195, a battery (replaceable part) 193, and motor connecter receivers 198a and 198b.

The motor control substrate 191 controls each of the motors, that is, the first motor 111, the second motor 131, and other motors. The motor control substrate 191 includes a backup circuit for storing pivotal attitudes of the rotating shaft of each of the motors when the SCARA robot 100 is powered off.

The motor control substrate 191 is fixed to the lid section 180 with the bolts 196a to 196d via spacers 197a, 197b, 197c, and 197d, as shown in FIG. 7. A heat conductive sheet 199 is provided in a portion between the motor control substrate 191 and the lid section 180, that is, in the gap formed by the spacers 197a to 197d. The heat conductive sheet 199 is not necessarily made of a specific material and can be made of any material that excels in heat conductivity, for example, aluminum and copper.

The battery connecter receiver 195 connects the battery 193 to the motor control substrate 191. The battery connecter receiver 195 is provided on the motor control substrate 191.

The battery 193 is a battery for supplying the backup circuit described above with electric power. In the present embodiment, the battery 193 is formed of three cylindrical batteries. The battery 193 is disposed on the motor control substrate 191 via a support base 193a.

The battery 193 is provided with a battery connector 192 for connection purposes via wiring lines 192a. The battery connector 192 is connected to the battery connecter receiver 195. The battery 193 is thus electrically connected to the motor control substrate 191.

The motor connecter receivers 198a and 198b connect the motors to the motor control substrate 191 via wiring lines 194a and 194b and connectors (not shown). The motor connecter receivers 198a and 198b are disposed at the center of the motor control substrate 191 in the longitudinal direction thereof but at opposite ends of the motor control substrate 191 in the width direction thereof, as shown in FIG. 8.

The motor connecter receiver 198a is disposed on the side away from the base 110 (−Y side) in the state in which the replacement unit 200 is held by the base 110. The motor connecter receiver 198b is disposed on the side close to the base 110 (+Y side) in the state in which the replacement unit 200 is held by the base 110. In the present embodiment, the wiring line 194a connected to the motor connecter receiver 198a is longer than the wiring line 198b connected to the motor connecter receiver 198b in terms of length extendable out of the base 110 (on −Y side).

A procedure of replacing the battery 193 will next be described.

First, the bolts 182a to 182d that fix the replacement unit 200 are detached from the enclosure 110a of the base 110, and the replacement unit 200 is detached from the base 110.

The detached replacement unit 200 is inserted into the opening 114 with the chamfered portion 181a of the lid-side cutout 181 in the lid section 180 facing the interior of the base 110 (+Y side). The lid-side cutout 181 formed in the lid section 180 is then allowed to engage with the engaging portion 113b formed as part of the rear wall 113 of the base 110.

Once the lid-side cutout 181 and the engaging portion 113b engage with each other, the lid section 180 is sandwiched between the sandwiching portions 115a and 115b. As a result, the inner wall of the lid-side cutout 181 interferes with the rear wall 113, and the inner wall of the base-side cutout 115 interferes with the lid section 180, whereby horizontal movement of the replacement unit 200 is restricted and the replacement unit 200 is held by the base 110 (enclosure 110a).

The replacement unit 200 is so held that a principal surface of the lid section 180, in which the lid-side cutout 181 is formed, for example, the rear surface 180b intersects the rear surface 113a, in which the base-side cutout 115 is formed, at right angles. Part of the replacement unit 200 held by the base 110 is accommodated in the base 110 via the opening 114.

The thus held replacement unit 200 is so oriented that the replacement section 190 provided in the replacement unit 200 faces away (faces −X side) from the side toward which the base-side cutout 115 is shifted from the center of the opening 114 in the width direction thereof (X-axis direction), as shown in FIG. 7. The chamfered portion 181a of the lid-side cutout 181 is so provided that the chamfered portion 181a faces the interior of the enclosure 110a (+Y side).

Since the lid-side cutout 181 is inclined to the longer sides of the outer shape of the lid section 180 by the angle θ, the replacement unit 200 is so held that the longer sides of the outer shape thereof are inclined to the vertical direction (Z-axis direction) by the angle θ toward the outer side of the base 110 (−Y side).

In the state in which the replacement unit 200 is held by the base 110 as described above, the battery connector 192 connected to the battery connecter receiver 195 is detached and the battery 193 is replaced. A new battery is then connected, and the replacement unit 200 is fixed again to the enclosure 110a of the base 110.

After the procedure described above is carried out, the replacement operation of the battery 193 is completed.

According to the present embodiment, since the battery 193 can be replaced by detaching the replacement unit 200 from the enclosure 110a of the base 110, the entire enclosure 110a or an entire rear cover is not required to be detached. According to the thus configured present embodiment, a robot that allows the battery and other replaceable parts provided in the robot to be readily replaced is provided.

Further, according to the present embodiment, since the holding mechanism 210 allows the base 110 (enclosure 110a) to hold the replacement unit 200, the replacement unit 200 connected to the interior of the SCARA robot 100 via the wiring lines 194a and 194b is not required to be held by hand. According to the thus configured present embodiment, the battery 193 is readily replaced.

Further, according to the present embodiment, the holding mechanism 210, which is formed of the lid-side cutout 181, the engaging portion 113b, and the sandwiching portions 115a and 115b, can be configured by formation of cutouts in the lid section 180 and the base 110 (enclosure 110a) without provision of other members. According to the thus configured present embodiment, the holding mechanism 210 is readily formed.

Further, according to the present embodiment, the base 110 can hold the replacement unit 200 by simple operation of causing the lid-side cutout 181 and the engaging portion 113b to engage with each other.

Further, according to the present embodiment, the replacement unit 200 is provided in the base 110. The base 110 is unlikely to be surrounded by production facilities as compared with the first arm 120, the second arm 130, and other components. According to the thus configured present embodiment, the battery 193 is more readily replaced.

Further, according to the present embodiment, the lid-side cutout 181 has the chamfered portion 181a. To allow the base 110 to hold the replacement unit 200, the replacement unit 200 is inclined and inserted into the opening 114 with the chamfered portion 181a facing the interior of the base 110. The lid-side cutout 181 is therefore allowed to engage with the engaging portion 113b through the larger opening edge provided by the formation of the chamfered portion 181a, whereby the lid-side cutout 181 and the engaging portion 113b are readily allowed to engage with each other.

Further, according to the present embodiment, since the lid-side cutout 181 is inclined to the sides of the outer shape of the lid section 180, the replacement unit 200 can be inclined to and held by the base 110. That is, according to the present embodiment, the replacement unit 200 can be held by the base 110 through simple operation of inserting the inclined replacement unit 200 into the opening 114 and allowing the attitude of the replacement unit 200 roughly maintained.

Further, according to the present embodiment, when the replacement unit 200 is attached to the base 110, the lid section 180 covers the opening 114 and the base-side cutout 115, whereby protection performance of the base 110, for example, protection from dust can be improved.

Further, according to the present embodiment, the replacement unit 200 is so held that the motor connecter receiver 198a, to which the wiring line 194a long enough to be drawn from the interior of the base 110 to the outside is connected, is located on the side away from the base 110 (−Y side). According to the thus configured present embodiment, when the replacement unit 200 is held, the wiring lines 194a and 194b are unlikely to limit the movement of the replacement unit 200, whereby the replacement unit 200 is readily held by the base 110.

Further, according to the present embodiment, since the heat conductive sheet 199 is provided in a portion between the motor control substrate 191 and the lid section 180, heat generated in the motor control substrate 191 can be dissipated via the lid section 180 to the enclosure 110a of the base 110. According to the thus configured present embodiment, performance of cooling the motor control substrate 191 can be improved.

In the present embodiment, the following configurations can also be employed.

In the embodiment described above, the replacement unit 200 is provided in the base 110, but the configuration is not necessarily employed. In the present embodiment, the replacement unit 200 may be provided, for example, in the first arm 120 or any other portion of the SCARA robot 100.

In the embodiment described above, the holding mechanism 210 is formed of the lid-side cutout 181, the engaging portion 113*b*, and the sandwiching portions 115*a* and 115*b*, but the configuration is not necessarily employed as long as the holding mechanism 210 is formed of the lid-side cutout 181, the engaging portion 113*b* can hold the replacement unit 200. In the present embodiment, for example, the holding mechanism 210 may have a hook that allows the replacement unit 200 to engage with the base 110 or may have a stage on which the replacement unit 200 can be placed.

In the present embodiment, the holding mechanism 210 may instead be a hinge-shaped portion. In this case, the base 110 and the replacement unit 200 (lid section 180) are connected to each other via the hinge. That is, in this case, when the replacement unit 200 is so swung open that the replacement section 190 is exposed to the outside, the hinge allows the base 110 to hold the replacement unit 200.

In the present embodiment, the holding mechanism 210 may not include the sandwiching portions 115*a* and 115*b*. That is, the base-side cutout 115 may not be formed in the enclosure 110*a* of the base 110.

In the present embodiment, the holding mechanism 210 or part thereof is not necessarily provided at the location where the replacement unit 200 is provided. For example, even when the replacement unit 200 is provided in the base 110 as in the present embodiment, the holding mechanism 210 may be provided in the first arm 120 or any other member.

In the embodiment described above, the battery 193 is a replaceable part but any other component may be a replaceable part. In the present embodiment, a replaceable part may, for example, be any of a variety of sensors, such as a gyro sensor and a temperature sensor, or a motor. Further, a replaceable part is not necessarily replaced when the life of the part expires and may be replaced, for example, when the part experiences failure or when a higher performance part is used. That is, in the present embodiment, the term "replaceable part" means not only a part to be inevitably replaced due, for example, to life or failure thereof but also apart to be possibly replaced in accordance, for example, with the function or application of the robot.

In the embodiment described above, the attachment and detachment section is the battery connecter receiver 195, but the configuration is not necessarily employed. In the present embodiment, the attachment and detachment section is not limited to a specific portion and may be any portion to and from which a replaceable part can be attach and detached. In the present embodiment, for example, even in the case where the battery is a replaceable part as in the embodiment described above, the attachment and detachment section may be a battery box that accommodates the battery and is provided in the replacement unit 200. Further, in the present embodiment, when any of the motors is a replaceable part, the attachment and detachment section may be a fixing portion to which the motor is fixed and is provided in the replacement unit 200.

In the embodiment described above, the battery 193 is provided in the replacement section 190, but the configuration is not necessarily employed. In the present embodiment, as long as the battery connecter receiver 195 for the battery 193 is provided in the replacement section 190, the battery 193 may be provided at any location in the interior of the enclosure of the SCARA robot 100.

In the present embodiment, the replacement unit 200 may include a spare part that replaces a replaceable part provided in the replacement unit 200. For example, in the example of the embodiment described above, in addition to the battery 193, the replacement unit 200 may include a spare replacement battery.

In the present embodiment, the heat conductive sheet 199 may be omitted.

In the embodiment described above, the robot is a SCARA robot by way of example, but the robot is not necessarily a SCARA robot. The present embodiment is applicable to any robot as long as it is defined as a robot. In the present embodiment, for example, a vertically articulated robot, a parallel link robot, a gantry robot (Cartesian coordinate robot), or a humanoid robot may be selected as the robot.

The entire disclosure of Japanese Patent Application No. 2013-223014, filed Oct. 28, 2013 is expressly incorporated by reference herein.

What is claimed is:

1. A robot comprising:
an enclosure having an opening formed therein;
a lid section that is provided on the enclosure in a detachable manner and blocks at least part of the opening;
an attachment and detachment section which is provided on the lid section on the side facing the opening of the enclosure and to and from which a replaceable part is attached and detached; and
a holding mechanism that allows the enclosure to hold the lid section when the lid section is detached from the enclosure,
wherein the holding mechanism includes a cutout formed in the lid section and an engaging portion that constitutes the opening and engages with the cutout, and
the holding mechanism further includes a sandwiching portion that sandwiches the lid section in a position shifted from the engaging portion toward the lid section when the cutout and the engaging portion engage with each other.

2. The robot according to claim 1,
wherein the replaceable part is a battery.

3. The robot according to claim 1, further comprising:
a movable member; and
a base that supports the movable member,
wherein the base includes the enclosure, and
the lid section is provided on the enclosure of the base.

4. A robot comprising:
a movable member;
a base that supports the movable member;
a lid section that is provided on an enclosure of the base in a detachable manner and blocks at least part of an opening formed in the enclosure;
an attachment and detachment section which is provided on the lid section on the side facing the opening of the enclosure and to and from which a replaceable part is attached and detached; and
a holding mechanism that allows the enclosure of the base to hold the lid section when the lid section is detached from the enclosure of the base,
wherein the holding mechanism includes a cutout formed in the lid section, an engaging portion that constitutes the opening and engages with the cutout, and a sandwiching portion that sandwiches the lid section in a position shifted from the engaging portion toward the lid section when the cutout and the engaging portion engage with each other,
the lid section is a rectangular flat plate in a plan view, and the cutout is inclined to one side of the outer shape of the lid section.

\* \* \* \* \*